US011729595B2

(12) United States Patent
Lindström

(10) Patent No.: US 11,729,595 B2
(45) Date of Patent: *Aug. 15, 2023

(54) APPARATUSES AND METHOD FOR TRANSMITTING PAYLOAD DATA BETWEEN HYGIENE EQUIPMENTS WITH RADIO TRANSMISSION CAPABILITIES

(71) Applicant: Essity Hygiene and Health Aktiebolag, Gothenburg (SE)

(72) Inventor: Håkan Lindström, Gothenburg (SE)

(73) Assignee: ESSITY HYGIENE AND HEALTH AKTIEBOLAG, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/888,863

(22) Filed: Aug. 16, 2022

(65) Prior Publication Data

US 2022/0394448 A1 Dec. 8, 2022

Related U.S. Application Data

(63) Continuation of application No. 16/467,514, filed as application No. PCT/EP2016/080143 on Dec. 7, 2016, now Pat. No. 11,445,347.

(51) Int. Cl.
*H04W 4/80* (2018.01)
*H04W 4/38* (2018.01)
(Continued)

(52) U.S. Cl.
CPC ............ *H04W 4/80* (2018.02); *H04W 4/38* (2018.02); *H04W 8/005* (2013.01); *H04W 84/18* (2013.01);
(Continued)

(58) Field of Classification Search
None
See application file for complete search history.

(56) References Cited

U.S. PATENT DOCUMENTS 4,412,292 A 10/1983 Sedam et al.
6,727,818 B1 4/2004 Wildman et al.
(Continued)

FOREIGN PATENT DOCUMENTS

AU 2014227493 A1 4/2015
EP 0919442 A2 6/1999

OTHER PUBLICATIONS

Clausen Lix T et al: "Mobile Ad Hoc Network (MANET) Neighborhood Discovery, Protocol (NHDP); rfc6130.txt", Mobile AD HOC Network (MANET) Neighborhood Discovery Protocol (NHDP); RFC6130.TXT, Internet Engineering Task Force, IETF; Standard, Internet Society (ISOC) 4, Rue Des Falaises CH-1205 Geneva, Switzerland, Apr. 6, 2011 (Apr. 6, 2011), pp. 1-88, XP015075953, [retrieved on Apr. 6, 2011], Paragraph [0001], Paragraphs [0004]-[4.3.3].

(Continued)

*Primary Examiner* — Tuan A Tran
(74) *Attorney, Agent, or Firm* — Cantor Colburn LLP

(57) ABSTRACT

A piece of hygiene equipment includes a transmitting section configured to transmit an outbound radio signal carrying transmission payload data; a receiving section configured to receive an inbound radio signal carrying reception payload data; a processing section configured to transmit an outbound radio signal carrying specific transmission payload data and/or to receive an inbound radio signal carrying specific reception payload data for determining a communication partner to which outbound radio signals are to be transmitted and from which inbound radio signals are to be received; and a memory section. The processing section is configured to determine said communication partner and to store information on the determined communication partner in said memory section.

18 Claims, 3 Drawing Sheets

(51) Int. Cl.
*G07F 9/00* (2006.01)
*G07F 11/00* (2006.01)
*G08B 1/08* (2006.01)
*G08B 23/00* (2006.01)
*H04W 8/00* (2009.01)
*H04W 84/18* (2009.01)
*A47K 5/06* (2006.01)
*A47K 10/32* (2006.01)

(52) U.S. Cl.
CPC ............... *A47K 5/06* (2013.01); *A47K 10/32* (2013.01); *A47K 2010/3226* (2013.01)

(56) References Cited

U.S. PATENT DOCUMENTS

| | | | |
|---|---|---|---|
| 7,084,737 B1 | 8/2006 | Moore et al. | |
| 7,432,807 B2 | 10/2008 | Schmitt | |
| 7,783,380 B2* | 8/2010 | York | A47K 10/3662 700/231 |
| 7,899,396 B2* | 3/2011 | Meylan | H04W 52/0216 455/448 |
| 8,131,231 B2* | 3/2012 | Yu | H04B 1/3805 455/114.2 |
| 8,135,344 B2* | 3/2012 | Krueger | H04W 4/18 370/320 |
| 8,565,112 B2* | 10/2013 | Peiris | H04W 52/367 370/339 |
| 8,684,236 B2* | 4/2014 | Ophardt | A47K 5/1217 222/181.3 |
| 8,687,732 B2* | 4/2014 | Guo | H04B 1/406 375/295 |
| 8,725,080 B2* | 5/2014 | Stankovska | H04W 72/541 455/511 |
| 8,750,796 B2* | 6/2014 | Claus | H04W 12/02 455/41.2 |
| 8,761,124 B2* | 6/2014 | Iacono | H04W 52/16 370/335 |
| 8,823,494 B1* | 9/2014 | Kovitz | H04W 12/003 340/10.1 |
| 9,265,383 B2* | 2/2016 | Yang | B05B 12/122 |
| 9,445,222 B2* | 9/2016 | Salokannel | H04W 4/80 |
| 9,686,049 B2* | 6/2017 | Fischer | H04L 1/188 |
| 9,886,810 B1* | 2/2018 | Murphy | G07F 9/002 |
| 9,892,372 B2* | 2/2018 | Himmelmann | G06Q 10/0631 |
| 9,913,562 B2* | 3/2018 | Wegelin | A47K 5/1217 |
| 10,238,242 B2* | 3/2019 | Macleod | G01F 23/263 |
| 10,410,507 B2* | 9/2019 | Pi | G08B 21/245 |
| 10,464,091 B2* | 11/2019 | Ophardt | A47K 5/12 |
| 10,524,621 B2* | 1/2020 | Ophardt | A47K 5/1217 |
| 10,685,528 B2* | 6/2020 | Murphy | G07F 9/002 |
| 2003/0033054 A1 | 2/2003 | Yamazaki | |
| 2004/0162106 A1* | 8/2004 | Monroe | H04W 88/06 455/552.1 |
| 2005/0035862 A1 | 2/2005 | Wildman et al. | |
| 2006/0096997 A1 | 5/2006 | Yeo | |
| 2007/0095901 A1 | 5/2007 | Illingworth | |
| 2008/0256648 A1 | 10/2008 | Piccionelli et al. | |
| 2010/0051637 A1* | 3/2010 | Shu | A47K 5/1217 221/9 |
| 2010/0117823 A1 | 5/2010 | Wholtjen | |
| 2012/0245729 A1* | 9/2012 | Wegelin | G01F 15/068 700/231 |
| 2012/0275319 A1* | 11/2012 | Peiris | H04W 52/367 370/339 |
| 2014/0022941 A1 | 1/2014 | Apte et al. | |
| 2014/0179231 A1 | 6/2014 | Charania et al. | |
| 2015/0199883 A1* | 7/2015 | Hartley | G08B 21/245 340/686.6 |
| 2016/0214817 A1* | 7/2016 | Borke | G05B 15/02 |

OTHER PUBLICATIONS

International Search Report and Written Opinion issued in International Application No. PCT/EP2016/080143; Application Filing Date Dec. 7, 2016; dated Aug. 7, 2017 (10 pages).
International Search Report and Written Opinion issued in International Application No. PCT/EP2016/080144; Application Filing Date Dec. 7, 2016; dated Mar. 9, 2017 (9 pages).
Office Action issued in European Application No. 16809361.5; Application Filing Date Dec. 7, 2016; dated Sep. 30, 2020 (6 pages).
Office Action issued in European Application No. 16810308.3; Application Filing Date Dec. 7, 2016; dated Oct. 9, 2020 (5 pages).
Oliver Staerz: "Smart Building and Cities", Apr. 1, 2016, pp. 1-20, XP055394117, Retrieved from the Internet: URL:http://www.fh-salzburg.ac.at/fileadmin /fh/studiengaenge/smb/talks/smb_Talk-for-E xperts_2016_5senseManagement_Hagleitner_O liverStaerz.pUf, [retrieved on Jul. 26, 2017], pp. 9-13.
Yasir Fayyaz et al: "Maximal Weight, Topology Discovery in Ad hoc Wireless Sensor Networks", 2010 10th IEEE International Conference on Computer and Information Technology (CIT), Piscataway, NJ, USA, Jun. 29, 2010, pp. 715-722, XP031757693, ISBN: 978-1-4244-7547-6, Paragraphs [OOVI]-[VLV].

* cited by examiner

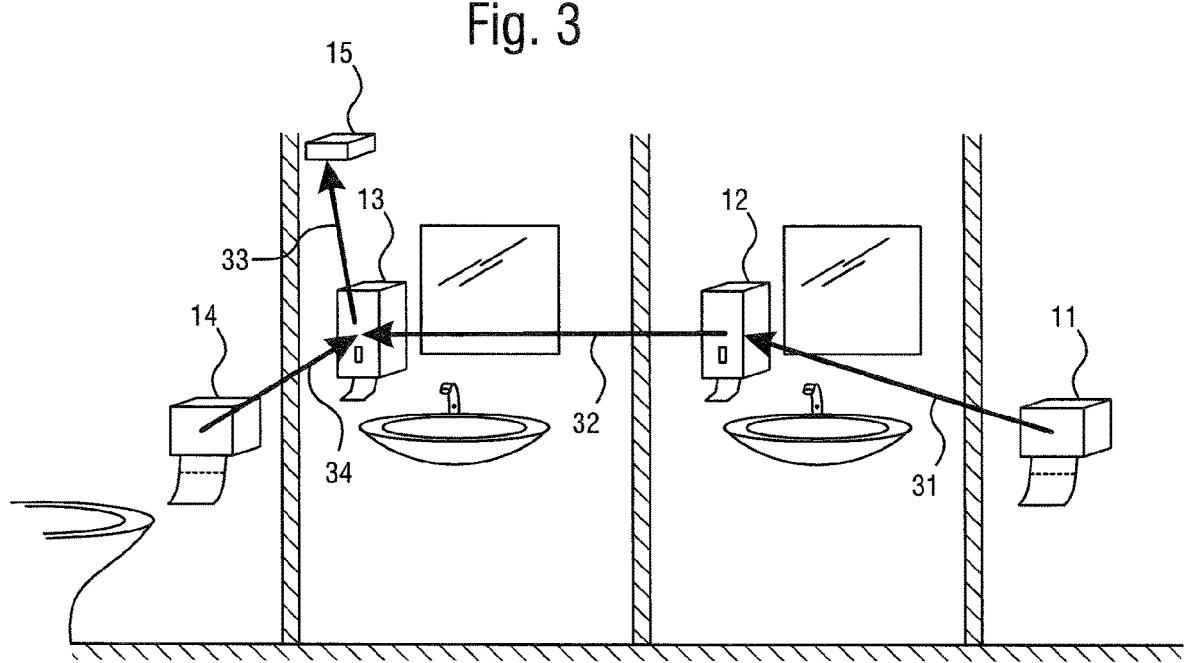
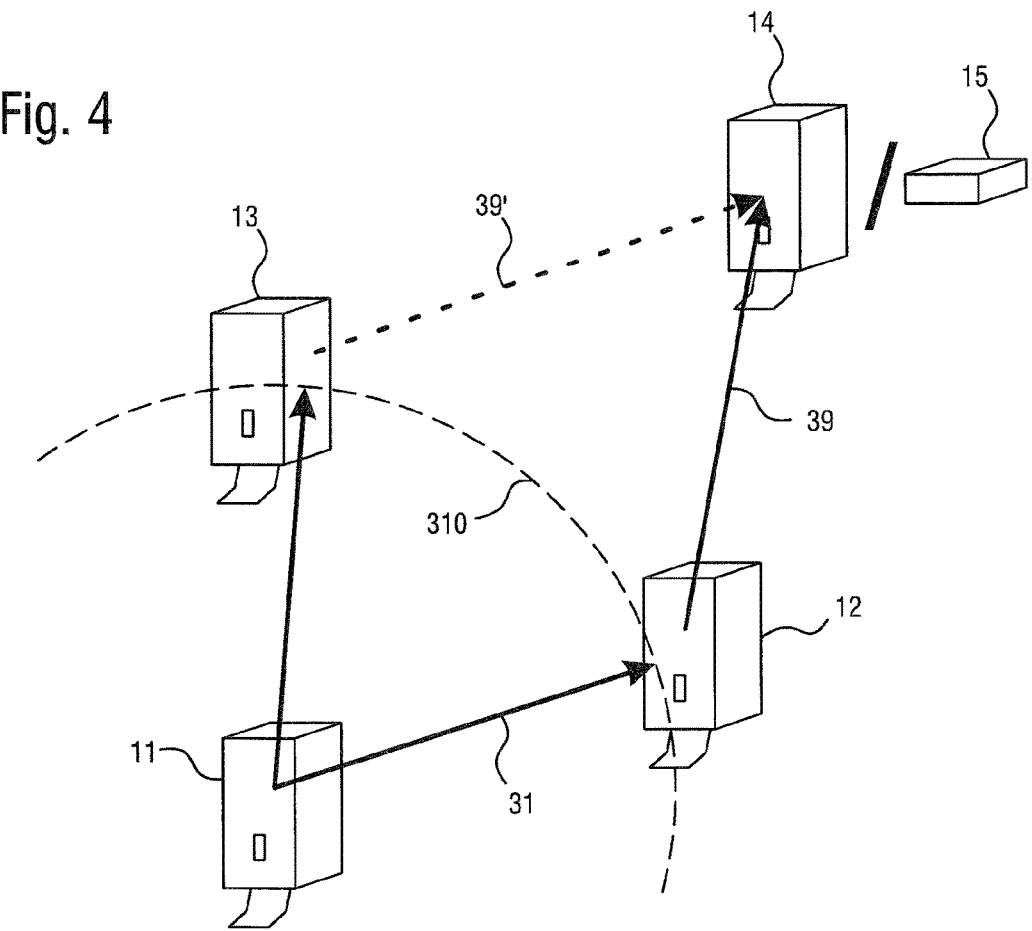

Fig. 5
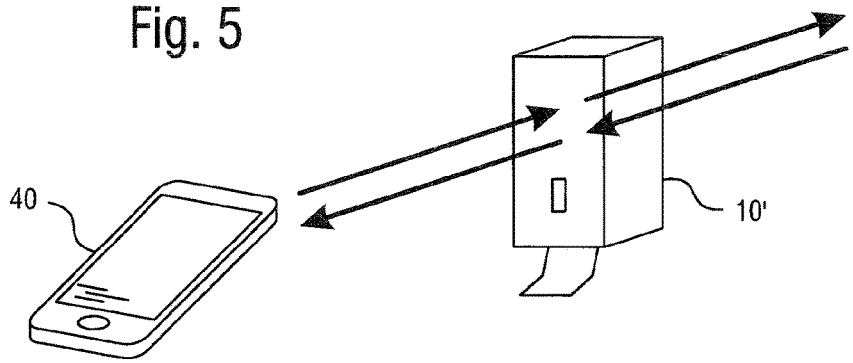
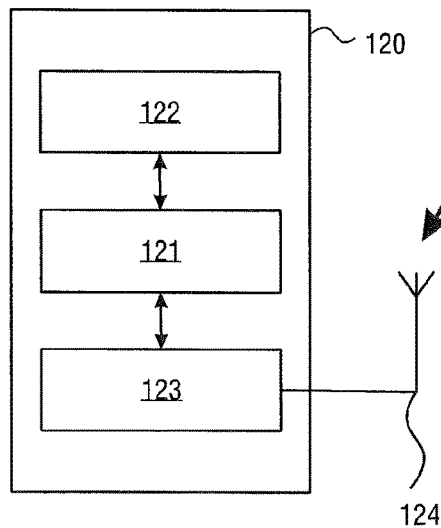
Fig. 6
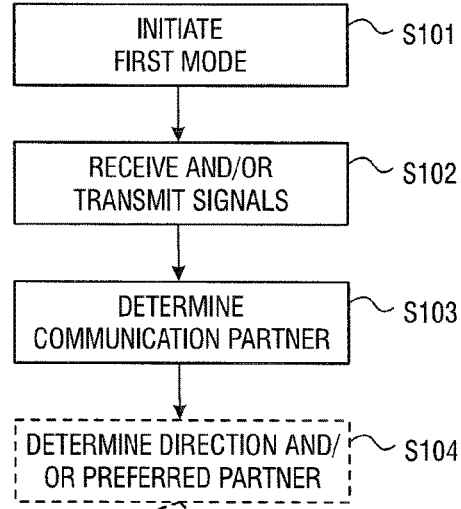
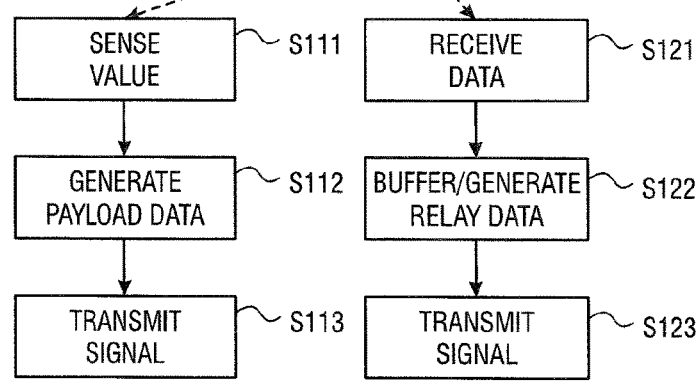
Fig. 7

APPARATUSES AND METHOD FOR TRANSMITTING PAYLOAD DATA BETWEEN HYGIENE EQUIPMENTS WITH RADIO TRANSMISSION CAPABILITIES

CROSS-REFERENCE TO RELATED APPLICATION

The present application is a continuation of U.S. application Ser. No. 16/467,514, filed Jun. 7, 2019, which is a national stage entry under 35 U.S.C. § 371 of, and claims priority to, International Application No. PCT/EP2016/080143, filed Dec. 7, 2016, the disclosure of which is hereby incorporated herein by reference in its entirety.

FIELD OF THE INVENTION

The present invention relates to hygiene equipment with radio transmission capabilities. More specifically, the present invention relates to a piece of hygiene equipment that can be arranged to dispense a consumable to a user, and/or to dispose a consumable from a user, and provides capabilities to receive and transmit radio signals. The present invention also relates to a system formed by two or more corresponding pieces of hygiene equipment.

BACKGROUND OF THE INVENTION

Hygiene equipment in the form of various dispensers and related devices is common in many premises that are frequented by a larger number of people. Specifically, such premises can be office buildings, manufacturing sites, hospitals, airports, train stations, bus terminals, shopping malls, restaurants, schools, kindergartens, and the like. Usually, such premises have in common that they are places that are visited by a considerable number of people and that hand or body hygiene or cleaning in general is desired at least to some degree. As a consequence, these premises will provide restroom or related facilities for the people working, staying in, or using these premises. For example, restrooms and toilets will be provided for the people working in an office building or visiting an airport.

In such facilities the mentioned hygiene equipment may be installed in form of soap, foam or towel dispensers, disinfectant (e.g., alcogel etc.) dispensers, toilet paper dispensers, hygiene bag dispensers, dispensers for hygiene products, such as absorbent articles, diapers, incontinence products, and other related devices. Usually, such hygiene equipment is predominantly present in restroom or toilet facilities. Likewise, such equipment may be found in entrance halls, kitchens, kitchenettes, offices, restaurants, canteens, conference/meeting rooms, receptions, reception areas, elevator, waiting areas, printer rooms and docucenters, gyms, or disposal areas. In the case of a hospital, for example, hygiene equipment will be present virtually everywhere, since doctors and caring personnel will need access to such facilities also when not using a restroom or toilet facility. Specifically, there may be rules and schemes that prescribe the use of hygiene equipment whenever entering some dedicated area, when approaching a patient, or, generally, before carrying out any tasks that require respective hygiene.

In the above examples, the piece of hygiene equipment may be configured to dispense a consumable to a user. The consumable may be identified as any article that the user employs for a hygienic purpose, so that possible articles include an amount of soap or algogel, towels, tissues, hygienic/absorbent articles, etc. Likewise, however, the piece of hygiene equipment may well be configured to dispose a consumable from a user so that it as such may take the form of a waste bin, used towel bin, and the like.

Especially in the case of dispensers as one form of hygiene equipment, it is understood that any dispenser should have sufficient supply of the substance it is dispensing (soap, paper, alcogel, etc.). Naturally, any local supply will be finite and a dispenser will run out of supply when used a certain number of instances. For example, a soap dispenser may be arranged to dispense a somewhat constant amount of substance (e.g., soap) whenever a user of the dispenser activates a lever, button, or sensor. After some number of activations, the supply within the dispenser will run empty and the dispenser may not be able any longer to serve its purpose until refilled.

It is known in the arts to provide hygiene equipment in the form of dispensers with sensors that can detect that a given supply is about to run out or has run empty. The result of this detection can be made visible on the dispenser so that service personnel can take notice of a necessity to refill the dispenser. Likewise, it is known to provide such hygiene equipment with electronic capabilities for not only detecting the necessity for a refill, but also for conveying information on such a necessity for a refill to a somewhat central location. For example, a server of, or connected to a data network (e.g., Internet) can receive and store such notifications in order for allowing service personnel to receive or obtain corresponding indications that a refill needs to be carried out at the site of a certain dispenser.

In the latter case of communicating corresponding information to some kind of central data repository, server, or terminal, it is usually necessary to associate any indication of a necessary refill with at least some kind of information that indicates an identification and/or location of the respective piece of hygiene equipment. Namely, it is of course desirable for the service personnel to know in advance where to go and what kind of refill to bring. Such information may also be used for planning or optimizing supply routes when personnel are to service a larger number of pieces of hygiene equipment.

In view of these requirements, the employed solutions need to be able to convey the corresponding information from the source, e.g., one particular dispenser, to a target, such as a server or data repository. It is known that hygiene equipment can be provided with radio transmission capabilities so as to transmit any suitable information to some kind of receiver which can be a dedicated data collection point or a receiver of a wireless network (e.g., radio base station, eNB, etc.). In any way, such a receiver then usually provides the forwarding of the data to the target by means of one or more networks, including any one of a local area network (LAN), wireless local area network (WLAN, WiFi, WiMAX, etc.), Internet, cellular telecommunication network, and any other suitable radio (wireless) or wirebound technique.

Although such conventional technologies allow thus for wireless data transmission with hygiene equipment, they however are unable to generally dispense with the necessity to provide dedicated wiring to at least some kind of data access points, or at least to observe free signal paths from one source device to a given data sink. Specifically, the conventional technologies still require that—amongst others—a dispenser can clearly enough communicate with its associated base station (that may be even located outside the premises when being one of a cellular communication network) or that the associated data collection point has access to the employed network (i.e., by wiring or via again a base station).

In other words, there is the need to establish an information path from a piece of hygiene equipment as the radio data source (consumption, level information) to the access point or base station as the radio data sink. The data sink in this case is the target access point to which the data is forwarded from the hygiene equipment, and from which it is forwarded toward a server or other central data repository and processing entity. This usually requires some kind of configuration of the involved components so as to make sure that data can be reliably reported. For example, a piece of hygiene equipment is "paired" to one access point for avoiding any cross talk and interference with any further neighboring equipment. The setup of any larger number of such pieces of hygiene equipment thus involves elaborated planning, is therefore complicated and also the use of the provided data transmission capabilities is limited.

In the light of the above, it is an object of the present invention to provide hygiene equipment and related systems that can substantially facilitate the communication and markedly reduce the efforts and considerations that are usually necessary when planning and setting up the conventional concepts. Moreover, it is an object of the present invention to substantially improve the use of the radio transmission capabilities of hygiene equipment.

SUMMARY OF THE INVENTION

According to one embodiment of the present invention, there is provided a piece of hygiene equipment comprising a transmitting section configured to transmit an outbound radio signal carrying transmission payload data; a receiving section configured to receive an inbound radio signal carrying reception payload data; a processing section configured to transmit an outbound radio signal carrying specific transmission payload data and/or to receive an inbound radio signal carrying specific reception payload data for determining a communication partner to which outbound radio signals are to be transmitted and from which inbound radio signals are to be received; and a memory section, wherein the processing section is configured to determine said communication partner and to store information on the determined communication partner in said memory section.

According to another embodiment of the present invention, there is provided a system comprising a plurality of pieces of hygiene equipment according to one of the respective embodiments as described with the present disclosure and a target device being coupled to a communication network.

According to another embodiment of the present invention, there is provided a method of operating a piece of hygiene equipment, said method comprising the steps of transmitting an outbound radio signal carrying transmission payload data; receiving an inbound radio signal carrying reception payload data; transmitting an outbound radio signal carrying specific transmission payload data and/or receiving an inbound radio signal carrying specific reception payload data for determining a communication partner to which outbound radio signals are to be transmitted and from which inbound radio signals are to be received; determining said communication partner, and storing information on the determined communication partner in a memory section.

BRIEF DESCRIPTION OF THE DRAWINGS

Embodiments of the present invention, which are presented for a better understanding of the inventive concepts and which are not to be seen as limiting the invention, will now be described with reference to the figures in which:

FIG. 3 shows a schematic view of an installation of several pieces of hygiene equipment according to another embodiment of the present invention;

FIG. 4 shows a schematic view of an installation of several pieces of hygiene equipment according to another embodiment of the present invention;

FIG. 5 shows a schematic view of a mode of operation of a piece of hygiene equipment according to another embodiment of the present invention;

FIG. 6 shows a schematic view of a general internal configuration in a piece of hygiene equipment according to another embodiment of the present invention, and FIG. 7 shows a flowchart of a general method embodiment of the present invention.

DETAILED DESCRIPTION OF THE INVENTION

Figure 1A:
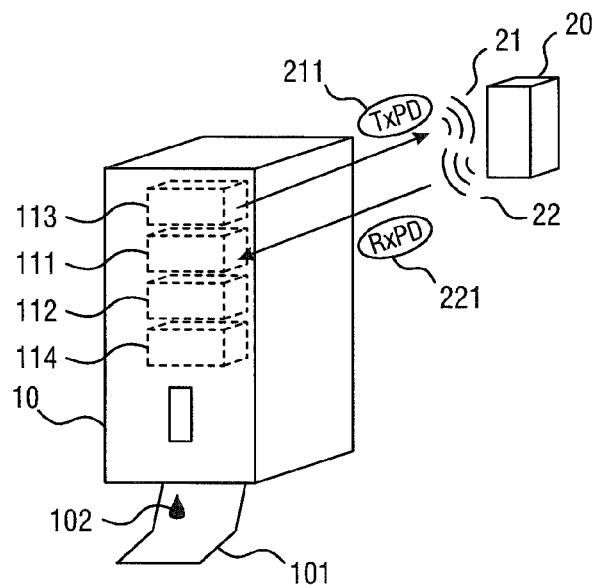
FIGS. 1A and 1B show schematic views of a piece of hygiene equipment according to embodiments of the present invention.

FIG. 1A shows a schematic view of a piece of hygiene equipment according to an embodiment of the present invention. Specifically, the piece of hygiene equipment is shown in the exemplary form of a dispenser 10 that dispenses soap or a disinfectant liquid/substance to a user. Generally, such dispensers may be activated by means of the user activating a lever 101 by some user's action which prompts a more or less predetermined volume of substance 102, or—generally—a consumable 102, to be ejected or dispensed.

For example, a user may push the lever so as to eject a quantity of soap onto his/her hand. Likewise, the dispensers of the present embodiment may comprise—in addition to or instead of the lever 101—for example a push button or an electronic sensor (proximity sensor, employing capacitive response or infrared signals) as the form of actuator. As a further option, the actuator may be tag-triggered in the sense that the actuation of the dispenser may be caused or triggered by a tag (electronic, RF-ID, near field communication, etc.) worn by a person about to use the dispenser. Optionally, the triggering may be made by means of a system and/or operator sensing by means of indoor position technologies that a target person (e.g., qualified or authorized person) is close to the dispenser. In such cases, the dispenser 10 may comprise also an electric actuator unit and some kind of power source for expelling the substance 102 in response to sensing the user's action.

The basic configuration of purely mechanical or electrically assisted dispensers is as such known in the arts, as such dispensers are commonplace in many facilities and buildings. The existing installations include both variants with and without a power supply for the dispensers. In case of electrically actuating or electronically supported dispensers, there need to be some kind of electrical power source provided for a dispenser. Specifically, this may be implemented by batteries that can be recharged and/or replaced. As the amount of energy required for dispensing a small volume of substance is limited, the approach using local batteries is usually an acceptable and economic solution. Naturally, also a connection to a mains power line can be considered.

The embodiments of the present invention may make use of a local power source or a connection to mains line which is already provided for the dispensing mechanism as such. However, in cases of a purely mechanical dispensing mechanism, a local power source in the form of a battery can be provided solely for the functionalities in connection with the radio transmission capabilities as described in greater detail now in the following. Alternatively or in addition, the power needed for the radio transmission capabilities can be generated by the mechanical actuation of the pushbutton or dedicated power-generating devices such as solar cells or other energy harvesting devices.

As shown in FIG. 1A, the dispenser 10 is a form of a piece of hygiene equipment configured to dispense a consumable to a user and comprises a transmitting section 113 configured to transmit an outbound radio signal 21 carrying transmission payload data (TxPD) 211 and a receiving section 111 configured to receive an inbound radio signal 22 carrying reception payload data (RxPD) 221. The piece of hygiene equipment 10 further comprises a processing section 112 configured to transmit an outbound radio signal carrying specific transmission payload data and/or to receive an inbound radio signal carrying specific reception payload data for determining a communication partner 20 to which outbound radio signals are to be transmitted and from which inbound radio signals are to be received. The piece of hygiene equipment 10 further comprises a memory section 114 and the processing section is configured to determine said communication partner and to store information on the determined communication partner in said memory section. Likewise, these functionalities may be as well implemented in a piece of hygiene equipment that disposes a consumable from a user, e.g., a waste bin to which users dispose of used tissues.

More specifically, the processing section 112 can be configured to instruct the transmission section 113 to transmit an outbound radio signal 21 carrying specific transmission payload data 211 that can be received by any suitable receiver within the transmission range of the transmission section 113. This range may be in the order of several meters, several tens of meters, hundred or several hundreds of meters, and more, depending on the employed transmission power and technology. With regard to the latter, any suitable technology and protocols may be employed and preferred standards and technologies include Bluetooth™, WiFi, WLAN, WiMAX, UWB (ultra wide band), LORAN, ZigBee, Z-wave, IEEE 802.11, IEEE 802.15, IEEE 802.15.4/4a (2006, 2007, 2011, . . . ) and related or similarly suitable technologies. The outbound signal 21 may be received by one possible communication partner 20, being a further piece of hygiene equipment or a dedicated access point or base station, which may send a return radio signal 22 carrying again specific payload data 221.

With the received specific payload data at hand, the processing section 112 can determine the device 20 as the communication partner to which outbound radio signals are to be transmitted and from which inbound radio signals are to be received. In this way, the processing section can store information on the determined communication partner 20 in the memory section 114. This information, as well as the information representing the specific transmission and/or reception payload data, can represent addresses or identification values of the involved devices. For example, the specific transmission payload data may represent an ID of the piece of hygiene equipment 10 and, optionally, data explicitly indicating the attempt to find a communication partner. The latter can receive this data and complete a so-called pairing process by responding with the specific reception payload data, including, for example, information on an ID or address of the device 20.

In the following (second) phase, the piece of hygiene equipment 10 may then employ this determined and stored information to specifically address any report payload data to this communication partner. In this way, any further equipment with reception capabilities and in the transmission range of the paired devices may ignore any signals and data exchanged between the piece of hygiene equipment 10 and the communication partner, or, in other words, the target device 20. Therefore, other devices refrain from forwarding data by sending out signals that may interfere with the signals sent out by the determined partner devices. Mechanisms for avoiding or at least reducing cross talk and interference with such further equipment are described elsewhere in the present disclosure. Furthermore, the above described pairing process may also be initiated by the piece of hygiene equipment 10 receiving an inbound radio signal carrying specific reception payload data. In this case, it would be the piece of hygiene equipment 10 that transmits a corresponding response as part of determining the communication partner 20.

Generally, the sections 111, 112, 113, and 114 may be implemented as separate components or circuits. However, a more common implementation may consider an arrangement in which the sections 111 to 114 are arranged in one module or on one circuit board (PCB). Some of the functionalities of the sections may be implemented by a shared circuit in the sense that a microprocessor circuit implements not only the processing section 112 and the memory section 114, but also part of the receiving and transmissions sections 111 and 113. For example, the radio frequency circuitry as part of the receiving and transmission section may be controlled by the one common microprocessor circuit. As a consequence also parts of the respective sections may be implemented as code being stored in some kind of memory for being executed by the processing section. The shown configuration as dashed-line boxes is thus for illustrative purposes only and should not to be seen as implying some particular embodiment of the sections 111 to 114, which should only be defined by their respective functionality.

In a further embodiment, the piece of hygiene equipment 10 or the processing section 112 is configured to operate in a first mode and in a second mode. In the first mode the processing section is configured to determine the communication partner by means of the described mechanisms. This first mode may thus be denoted also as a self-configuration mode in which the piece of hygiene equipment 10 establishes automatically the communication path to a further relaying device or a data sink in the form of an access point or base station. In this way, the burden of installing the piece of hygiene equipment 10 can be minimized. Namely, the piece of hygiene equipment 10 may subsequently switch to said second mode during which the processing section is configured to compile and transmit said transmission payload data in relation to a value determined so as to relate to the reservoir of the consumable it dispenses.

In another embodiment, this first "self-configuration" mode is activated for a predetermined time after power-up of the piece of hygiene equipment. In this way, the piece of hygiene equipment can be installed and powered-up at the same instance. The predetermined time can be chosen so as to allow a reliable self-setup of the system, i.e., a plurality of pieces of hygiene equipment and related data sinks. During this first phase of self-configuration each piece of hygiene equipment establishes a direct or indirect path to a data sink so as to subsequently be able to report data during the second operation phase. A direct path may be a communication path between one piece of hygiene equipment and a data access point, whereas an indirect path may be a communication path between one piece of hygiene equipment to the data access point over one or more intermediate pieces of hygiene equipment and/or dedicated relay devices. This aspect of relaying data with hygiene equipment is described in greater detail elsewhere in the present disclosure.

Suitable time spans for said predetermined time may be a day, several days, a week or several weeks. Further, the first phase may not only be initiated through a power-up, but also a command received by payload or a manual activation of a switch on or in the piece of hygiene equipment may set the device into the first mode. Generally, the pieces of hygiene equipment may return to the first phase of self-configuration or re-configuration at any suitable instance. For example, the equipment may do so regularly in some predetermined intervals or at predetermined points in time in order to maintain the system as a whole and possibly take into account for any added, removed or faulty devices. Likewise, the pieces of hygiene equipment may return to the first phase by means of a trigger, such as a command sent to the devices and/or operation of switch(es) provided for one or more pieces of hygiene equipment. In the latter case, a command for entering the first phase can be given to one device by operation a (possibly concealed) switch, where this device then forwards respective commands to the remaining devices.

As for the power-up case, the piece of hygiene equipment may further comprise an electric power source, preferably a battery. An insulating slip may initially inhibit an electrical connection to the electric power source, so that the device is generally in an inactive or idle state. The piece of hygiene equipment can be powered up, and, at the same time, set into the first self-configuration mode by removing said slip. This may substantially facilitate installation of pieces of hygiene equipment, above all when a larger number of devices are involved (e.g., during the installation of several tens or hundreds devices).

Figure 1B:
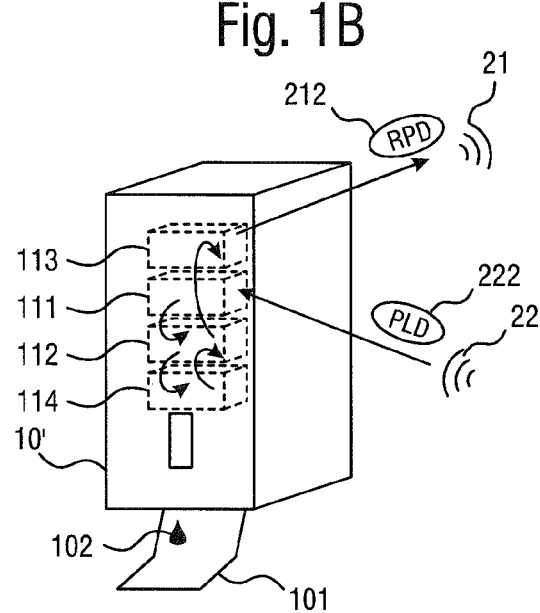

FIG. 1B shows a piece of hygiene equipment, for example a dispenser 10', according to a further embodiment of the present invention. Specifically, the receiving section 111 is further configured to receive a radio signal 22 which includes payload data (PLD) 222. The receiving section 111 is coupled to the processing section 112 which is now configured to relay at least a part of said payload data PLD that is received from the receiving section 111 toward a target recipient. This may involve also buffering the data to be relayed until the data can be actually forwarded, and, with this, relayed toward the next communication partner. The transmission section 113 can then be instructed to transmit the relayed payload data (RPD), i.e., at least a part of the received payload data PLD, toward the target recipient. For this purpose, the transmission section 113 emits a further radio signal 21 carrying said relayed payload data (RPD) 212.

The payload data PLD and RPD may comprise any suitable data which is to be conveyed over the dispenser. For example, the PLD may comprise data that identifies another piece of hygiene equipment and some kind of related data. The latter may indicate for example a filling state with regard to a reservoir of the consumable of that dispenser. Following this example, one dispenser may sense a filling state of the available consumable (e.g., soap, liquid, etc.) and convert the measured filling level or state into suitable data. In the case of a waste bin the filling state may indicate when the respective reservoir needs to be emptied, and in such situations there will be a need for servicing when the reservoir runs full and not empty.

In any way, this data may be combined with data identifying the dispenser and/or a location or position of that dispenser to form the PLD received with the signal 21. Likewise, any other suitable data may be carried by the system instead of or in addition to the mentioned filling state data. In particular, also status data, or data on a physical observable like luminosity, light, humidity, smell, temperature and the like may be conveyed. Furthermore, also data on occupancy or movement (by persons and/or equipment) or general content (e.g., messages, commercial images, etc.) may be subject to the disclosed relaying. Any data may be time-stamped in the sense that a measurement or detection result is accompanying with information on a time when an observable was measured or an event was detected (e.g., when a dispensing or disposing action was detected, in other words, when a user has actually used the piece of hygiene equipment).

The processing section 112 may simply forward this data for relaying or may well also modify and/or append this data. For example, own payload data may be generated on the basis of a filling state/level within the dispenser 10. Likewise, data identifying the dispenser 10 and/or a location or position of the dispenser 10 may be appended by the section 112 so as to be transmitted via section 113 as the radio signal 21. The embodiments of the present invention, however, consider that the dispenser is not only able to transmit payload data, but also has the functionality to receive data and to relay this data as payload data toward some target by means of the emitted radio signal 21. As a consequence, the embodiments of the present invention allow a multi-hop forwarding of data over two or more dispensers being installed within, a given coverage area as described now in greater detail.

In a further embodiment, the relaying function is not only employed in the second operation phase to convey data, e.g., on consumption or filling level, to the target entity, but also during the first self-configuration phase. Specifically, the specific transmission and/or reception payload data may include information that enables a determination of whether or not a sufficient path is established (completed). For example, a piece of hygiene equipment may determine also directional information in addition to information relating to paired communication partners. Said directional information may then indicate a preferred direction toward which any relayed or generated data is transmitted.

Figure 2:
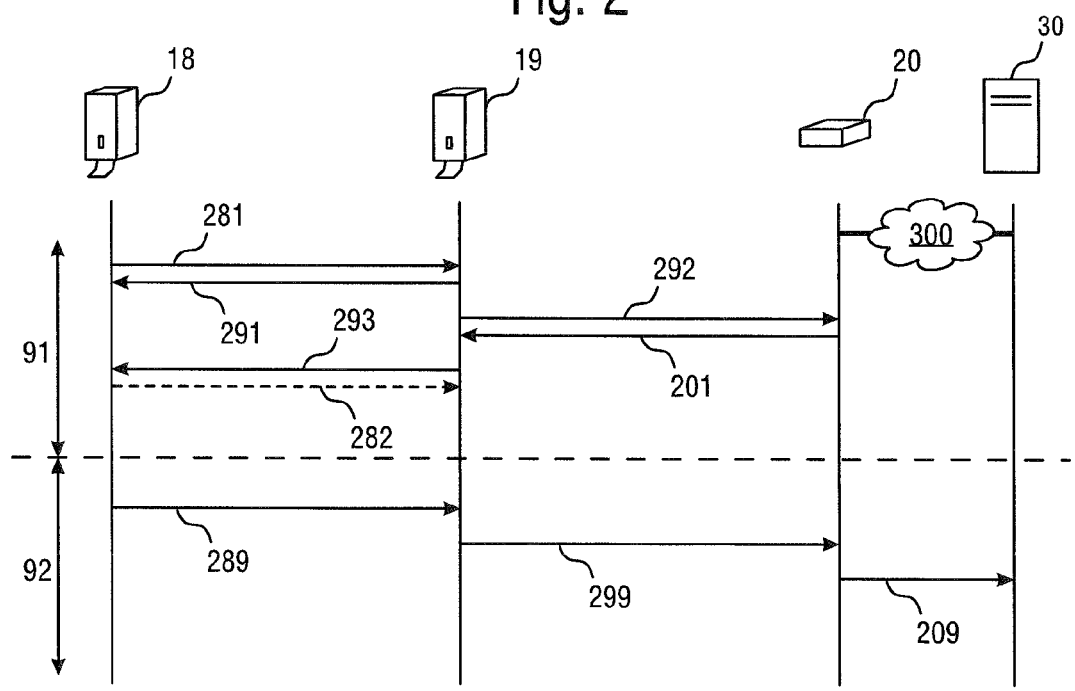
FIG. 2 shows a schematic sequence diagram of an exemplary modus operandi according to another embodiment of the present invention.

An exemplary modus operandi is shown schematically in FIG. 2. In particular, it is considered a set-up of several devices including a first piece 18 of hygiene equipment, a second piece 19 of hygiene equipment, an access point 20, and a (remote) server or data processing repository 30. The latter two are assumed to communicate over a network 300 which is as such known and includes any one of a local area network, a wireless local area network, a cellular telecommunications network, a satellite link, an intranet, the internet, and the like. During a first phase 91 at least some part of the involved devices may be in the first mode for automatically establishing communication paths. Specifically, the pieces 18 and 19 may determine each other as possible communication partners by exchanging data portions 281, 291, similarly as described in conjunction with FIG. 1A. The result of this procedure may be that both devices 18 and 19 have identified the other device as a potential communication partner, which would as such not establish a preferred communication direction.

The same procedure may be carried out with data 292, 201 exchanged between devices 19 and 20, where the latter device 20 is an access point in the sense that it can directly forward data to the server 30. This property may be known to the access point 20, so that corresponding information can be conveyed with data 201 to the device 19. In other words, devices 19 and 20 can determine that the direction from the device 19 to the device 20 is the preferred direction of forwarding or relaying data. Since device 19 is also aware of the further communication partner 18 but also is aware of the preferred direction toward device 20, corresponding data 293 is conveyed to device 18. As a result, the devices may store information relating to their communication partner as follows:

| Device: | Stores as communication partner: |
|---------|----------------------------------|
| 18      | 19                               |
| 19      | 20                               |
| 20      | n/a                              |

This implies the direction 18—>19—>20. In other words, the term communication partner is understood to identify the device to which data is preferably addressed and/or transmitted. Additionally, the embodiments of the present invention may consider one or more "fall-back" routes in order to make the data exchange system as such more robust. In such embodiments, an alternative communication path is established between the devices 18 and 20 over, say another piece of hygiene equipment. Should the communication over the device 19 in the above example fail, the communication could be routed from device 18 to device 20 via said other piece of hygiene equipment.

As part of the initial configuration and/or manufacturing, the device 20 can be made aware that it is a data access point and the direction of communication is preferably to the device 20. This information can be identified in the sense of directional information so that any device having such information can determine a preferred direction of forwarding/relaying or can communicate (e.g., step 293 in FIG. 2) the property to other devices so as to determine the proper forwarding/relaying direction. A step 282 of acknowledging the preferred direction is optional.

In a second operation phase 92 the involved devices may be in a second operation mode in which communication paths, partners, and directions do not need to be probed or established. Namely, the piece of hygiene equipment 18 may generate a report on the filling level of its reservoir and transmit this report as a data message 289. Since the piece of hygiene equipment 19 is in the same mode and knows about the partners and direction, it can relay this data with a data message 299 to the access point 20, which, eventually, can forward the data message 209 to the server 30. In this way, the operation data of the hygiene equipment as such is collected over a self-established system of communication paths. Naturally, the conveyed data can also relate to issues other than consumption or filling level and can likewise relate to commands to initiate the first mode, commands in general terms, request commands for collecting any other information such as IDs, power levels, position information, general purpose data packets carrying any suitable content.

FIG. 3 shows a schematic view of an installation of several pieces of hygiene equipment according to a further embodiment of the present invention. This installation is explained in the context of several restrooms that may be provided for different genders. The right-hand restroom may provide a toilet installation with a toilet paper dispenser 11 and a neighboring washing sink with a corresponding soap dispenser 12. Likewise, the left-hand restroom may provide also a toilet installation with a toilet paper dispenser 14 and a neighboring washing sink with a corresponding soap dispenser 13. Each installation may be separated by means of walls shown as hatched areas, which, in turn, allow radio signals to penetrate at least to a level that the payload can be received and transmitted in the following mode of operation.

Specifically, the toilet paper dispenser 11 may comprise a sensor that detects the filling state or level of the toilet paper. For example, in the case that the filling level reaches a minimum threshold value, the dispenser 11 compiles payload data indicating this level and an identification and/or position of dispenser 11. This payload data is transmitted from the dispenser 11 toward the soap dispenser 12 as the target with a first radio signal 31. The soap dispenser 12 is now arranged to receive the signal 31 and to relay the received payload data from the toilet paper dispenser 11 toward a "next" target in the form of the further soap dispenser 13 via signal 32. In turn, the dispenser 13 again acts as a relay for forwarding the payload data toward a target device 15 via signal 33. Similarly, the toilet paper dispenser 14 may relay its data via dispenser 13 toward the target device 15, which can be an access point. The above scenario may consider that during a first phase all necessary information on partners, paths and/or direction was exchanged amongst the involved devices.

In summary, a multi-hop arrangement can be implemented by means of several pieces of hygiene equipment in the form of, as shown here in the example of FIG. 3, soap and toilet paper dispensers. As a consequence, there may be no need for any wiring between the individual devices for establishing a multi-hop relaying of data. Furthermore, the overall extent of the communication range can be substantially increased, although one individual piece of hygiene equipment may only have a limited transmission range. That is, since the power resources available (e.g., in the form of a battery) may be limited, also the transmission power, and, with this, the range may be limited. As shown, however, the multi-hop arrangement by means of several relaying devices can extend the range over the entire installation of one or more restrooms.

The target device 15 may be some kind of network access point in the sense that the relayed and received data can be forwarded to a network. For example, the target device has access to a local area network (LAN) or a wireless LAN (WLAN, WiMAX, WiFi, etc.) or another telecommunication network (GSM, PCS, GPRS, EDGE, 3GPP, UMTS, LTE, etc.). In this way, the relayed and received data can be collected from a plurality of pieces of hygiene equipment and be forwarded to some kind of service point. Specifically, the facility management can receive or retrieve information on the basis of the transmitted payload data so as to initiate the refilling of any low running filling levels. In a way, the other devices (e.g., devices 11-14) have therefore an indirect or multi-hop access to one of the above-mentioned networks.

According to an embodiment of the present invention, the transmission section is arranged to check for any ongoing transmissions in a relevant frequency band prior to transmitting the relayed payload data. In other words, the transmission section "listens" before starting the transmission so as to avoid interference by transmitting into an already ongoing transmission process. According to a further embodiment of the present invention, the transmission is initiated only after a predetermined delay after receiving the payload data. In further embodiments, said predetermined delay is specific to the piece of hygiene equipment, so that two pieces of hygiene equipment likely have different predetermined delays.

In general, a piece of hygiene equipment according to an embodiment of the present invention has the capability of storing information that can identify the piece. Specifically, the processing section may be provided with a memory that stores an identifier or serial number in a non-volatile manner. In this way, the identification can be set during manufacturing, possibly as a unique identifier, or the identifier can be set or modified later by means of reprogramming the memory. In the context of the above-mentioned pre-determined delay it is noted that some embodiment of the present invention considers that the predetermined delay is dependent on the identifier. In other words, different identifiers may result in different values for the predetermined delay.

While it is clear that there may be a large number of different identifiers (e.g., an 8-digit serial number) it is likewise clear that a corresponding number of sufficiently different delays may not be feasible. In particular, this may result in some of the delay values to be undesirably long. As a consequence, a reuse scheme may be adapted so that, for example, an acceptable set of different delay values is reused over consecutive serial numbers. If this scheme is adopted consecutively with increasing serial number, the advantage can be obtained that units being manufactured during a given time interval are both likely to be shipped together and installed at the same premises as well as to have different delay values.

Moreover, a further embodiment of the present invention considers that the processing section is arranged to change the delay when interference is detected. Specifically, the processing section may employ the receiving section to monitor any present radio signals during the time when the transmission section transmits. If, for example, the transmitted relayed payload data can be well received, then this can be taken as an indication that no interference needs to be considered. However, should it be not possible to receive the transmitted relayed payload data during transmission, then this may be taken as an indication for interference and the delay may be changed. Again, this change may be made dependent of the identifier, so that two neighboring and interfering dispensers will eventually choose different values for the delay so as to relay data without interference.

FIG. 4 shows a schematic view of an installation of several pieces of hygiene equipment according to another embodiment of the present invention. Specifically, the mode of operation with regard to transmission delay and possible interference shall be described. A first piece of hygiene equipment is configured to emit a radio signal 31 comprising payload data into a range 310 where the signal 31 can be received essentially contemporaneously by the second piece of hygiene equipment 12 and third piece of hygiene equipment 13.

In case both the second piece of hygiene equipment 12 and third piece of hygiene equipment 13 would be configured in the same way, a situation may need to be considered in which both pieces transmit the relayed payload data by radio signals 39 and 39' essentially at the same time. As a consequence, interference between signals 39 and 39' may occur which may render it impossible for the fourth piece of hygiene equipment 14—or the access point 15—to receive a signal in a proper way.

Some embodiments of the present invention provide a configuration that allows two or more of pieces of hygiene equipment that all receive payload data to relay this data without interference and disruption and in a reliable way. In a specific embodiment, the pieces of hygiene equipment consider varying delay values for delaying the transmission of relayed payload data. In the particular example of FIG. 4, this may be implemented as follows: For example, the second piece of hygiene equipment (e.g., dispenser) 12 is configured with a shorter delay as compared to the third dispenser 13.

As a consequence, the dispenser 12 can emit the radio signal 39 toward the target without interference, since the third dispenser 13 is still waiting for its (longer) delay to elapse. After also this delay has elapsed, the dispenser 13 may also transmit the radio signal 39', which may be used for an increase of reliability by redundancy by the target 14 or 15, or may be simply ignored. In the latter case, any receiving entity (e.g., target or piece of hygiene equipment) may buffer a data message (payload data) for at least the time of a longest delay in the system, and compare any received data to data recently relayed and transmitted in order to decide whether a further transmission of relayed payload data may be suppressed.

Likewise, in another embodiment, the piece of hygienic equipment 13 may monitor any further transmissions from other devices in response of receiving a signal with payload data to be relayed. Specifically, the third piece of hygiene equipment 13 may also receive the radio signal 39 transmitted from the second piece of hygiene equipment 12 and thus may realize that data corresponding to the signal 31 has already been forwarded for relaying. As a consequence, the device 13, just as generally any piece of hygiene equipment according to this embodiment, may decide on its own whether or not to transmit the data to be relayed.

As already mentioned, there are embodiments in which a delay value is dependent on an identifier of the individual piece of hygiene equipment. In this way, for example, it can be ensured that devices 12 and 13 have not conflicting (same or similar) delays, where they would transmit any data to be relayed at overlapping times which would—in turn—likely produce interference and render at least problematic the reception of the data by the target entity. Specifically, devices manufactured with serial numbers in the vicinity/proximity or a given range may be ensured to all have default delays that differ from each other. As a consequence, when devices 12 and 13 are installed at the same time, it can be ensured that no interference occurs.

However, there also exists the possibility that neighboring devices are provided with conflicting delays due to various reasons (replacement devices, coincidence, etc.). In some embodiments of the present invention it is, therefore, considered to activate signal reception also during signal transmission. In this way, a piece of hygiene equipment may detect the occurrence of interference during the time it transmits a radio signal for relaying payload data. In response to a corresponding detection, the delay may be changed, this, in turn, optionally again in dependence of the identifier. As a consequence, it can be ensured that two neighboring pieces of hygiene equipment carrying different identifiers switch to non-conflicting delays after interference has occurred.

In the above, several embodiments have been described that provide at least one of various advantages. Specifically, the pieces of hygiene equipment can be installed at the desired locations without the need for any manual or additional configuration effort. To the contrary, the devices are able to build a real self-organized "network" for relaying and forwarding data toward a given target. This can substantially facilitate the setup and mounting of pieces of hygiene equipment with the corresponding functionalities. Naturally, the devices may be still equipped with switches or a communication interface that allows for manual reprogramming once the automatic procedures for relaying data fail or needs to be modified for other reasons.

In a further embodiment a piece of hygiene equipment has a processing section that is further arranged to add data to the data to be relayed before transmitting. In the shown exemplary situation of FIG. 4, the dispenser 12 may receive data from the dispenser 11 which is data to be relayed toward the device/dispenser 14. However, in this embodiment, dispenser 12 adds data, for example in relation to its own filling state or its own measured observable, to the data to be relayed before transmitting any signals. In this way, the device/dispenser 14 receives data from both originators, namely dispenser 11 and 12 in this case, in one instance. This way forward can substantially contribute in saving power resources in the involved pieces of hygiene equipment, since the number of transmission instances can be reduced by "accumulating" data before the actual transmission.

FIG. 5 shows a schematic view of a mode of operation of a piece of hygiene equipment according to another embodiment of the present invention. Specifically, the piece of hygiene equipment 10' is using at least toward one species of devices a standardized communication scheme and protocol that is compatible with devices other than generic pieces of hygiene equipment. In particular, the device (dispenser) 10' is configured to receive data from and transmit data to a mobile communication device 40, which is for example a mobile phone, a wearable, a mobile computing device with wireless communication capabilities or the like. In this way, the dispenser 10' may act as an access and relay point for the use with such communication devices.

For example, the dispenser 10' may communicate with the device 40 by any suitable standard (e.g., WLAN, WiFi, WiMAX, Bluetooth, etc.) so as to receive and transmit data. This data can be relayed to further pieces of hygiene equipment and/or a target access point which may be—in turn—connected to a local area network and/or the internet. In other words, the piece 10' of hygiene equipment may act as an access point for a wireless network and may thus convey network access to restrooms and related facilities without the need for installing dedicated hardware. In a further embodiment, the piece of hygiene equipment employs one of the standard communication schemes and protocols also toward further pieces of hygiene equipment for implementing one of the other embodiments of the present invention as described in conjunction with the present disclosure.

FIG. 6 shows a schematic view of a general internal configuration in a piece of hygiene equipment according to another embodiment of the present invention. Specifically, a piece of hygiene equipment comprises at least a module 120 for providing the disclosed functionalities. This module 120 may comprise one or more circuitries with a processing unit 121, a memory circuitry 122, and a communication unit 123 which is in turn coupled to an antenna device 124. The communication unit and the antenna 124 are configured to receive radio signals and to transmit radio signals at concurrent or alternate times. In this way the sections 111 to 114 as described elsewhere in the present disclosure can be implemented.

The memory circuit 122 stores code that can instruct the processing unit 121 to implement one or more embodiments of the present invention. Specifically, module 120 may be provided in or for a piece of hygiene equipment configured to dispense a consumable to a user. The memory circuit 122 may then store code that can instruct the processing unit 121 to implement or control a transmitting section for transmitting an outbound radio signal carrying transmission payload data, a receiving section for receiving an inbound radio signal carrying reception payload data, and a processing section for transmitting an outbound radio signal carrying specific transmission payload data and/or to receiving an inbound radio signal carrying specific reception payload data for determining a communication partner to which outbound radio signals are to be transmitted and from which inbound radio signals are to be received. The memory section mentioned elsewhere in the present invention can also be implemented by the memory circuit 122.

FIG. 7 shows a flowchart of a general method embodiment of the present invention. Specifically, this method is for implementing or operating a piece of hygiene equipment configured to dispense a consumable to a user and comprises the step S101 of initiating a first mode in which one or more pieces of hygiene equipment and an access point are self-configuring. Specifically, in a step S102 signals are received and/or transmitted in order to determine a communication partner in step S103. Optionally, also a preferred direction of communication or a preferred communication partner is determined in step S104.

In a second mode, a value is sensed in step S111 which may relate to a reservoir of the consumable. In relation to the sensed value corresponding payload data is generated in step S112 and transmitted with a radio signal in step S113. In the same second mode also relaying may occur which would involve a step S121 of receiving data to be relayed, a step S122 of buffering the relay data and generating corresponding payload data, where the latter is transmitted with a signal in step S123 toward a preferred communication partner.

Although detailed embodiments have been described, these only serve to provide a better understanding of the invention defined by the independent claims, and are not to be seen as limiting.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicant's invention.

What is claimed is:

1. A piece of hygiene equipment, comprising:
    a transmitting section configured to transmit an outbound radio signal carrying transmission payload data;
    a receiving section configured to receive an inbound radio signal carrying reception payload data;
    a processing section configured to perform one or both of transmit an outbound radio signal carrying specific transmission payload data, and receive an inbound radio signal carrying specific reception payload data for determining a communication partner to which outbound radio signals are to be transmitted and from which inbound radio signals are to be received; and
    a memory section, wherein the processing section is configured to determine said communication partner and to store information representing the determined communication partner in said memory section, and wherein the processing section is further arranged to determine whether a radio signal is presently being transmitted toward the receiving section and to delay the transmitting of a signal by the processing section as long as a radio signal is being transmitted toward the receiving section, wherein the processing section is configured to buffer received payload data carried by an inbound radio signal and to transmit said buffered received payload data as relay payload data carried by an outbound radio signal to the communication partner, and wherein the processing section is further arranged to delay the transmitting of the relayed payload data according to a predetermined value, and to change said predetermined value in response to determining an occurrence of interference.

2. The piece of hygiene equipment according to claim 1, further being configured to dispense a consumable to a user or to dispose a consumable from a user, and further comprising a sensor section configured to determine a value relating to a reservoir of said consumable, wherein the processing section is arranged to compile the transmission payload data in relation to the determined value.

3. The piece of hygiene equipment according to claim 1, wherein said processing section is configured to operate in a first mode and in a second mode, wherein during said first mode the processing section is configured to determine the communication partner, and wherein during said second mode the processing section is configured to compile and transmit said transmission payload data.

4. The piece of hygiene equipment according to claim 3, wherein said processing section is configured during said second mode to compile and transmit said transmission payload data in relation to the determined value relating to the reservoir of said consumable.

5. The piece of hygiene equipment according to claim 3, wherein the first mode is activated for a predetermined time after power-up of the piece of hygiene equipment.

6. The piece of hygiene equipment according to claim 1, wherein the piece of hygiene equipment further comprises an electric power source.

7. The piece of hygiene equipment according to claim 6, wherein an insulating slip inhibits an electrical connection to the electric power source, and the piece of hygiene equipment is powered up by removing said slip.

8. The piece of hygiene equipment according to claim 1, wherein the processing section is configured to determine a preferred communication partner or a preferred direction for transmitting data toward a specific communication data.

9. The piece of hygiene equipment according to claim 1, wherein the predetermined value is specific to the piece of hygiene equipment.

10. The piece of hygiene equipment according to claim 9, wherein the piece of hygiene equipment has assigned an identifier, and wherein the predetermined value is set in relation to said identifier.

11. The piece of hygiene equipment according to claim 1, wherein the processing section is further arranged to monitor a radio signal being transmitted toward the receiving section during the transmitting of a signal for determining an occurrence of interference.

12. The piece of hygiene equipment according to claim 1, wherein the processing section is further arranged to change said predetermined value.

13. The piece of hygiene equipment according to claim 1, wherein the change of said predetermined value is dependent on an identifier of the piece of hygiene equipment.

14. The piece of hygiene equipment according to claim 1, wherein the processing section is further arranged to accumulate data to be relayed before transmitting.

15. The piece of hygiene equipment according to claim 14, wherein the processing section is further arranged to add data to the data to be relayed before transmitting.

16. The piece of hygiene equipment according to claim 1, comprising any one of a soap dispenser, towel dispenser, disinfectant dispenser, alcogel dispenser, tissue dispenser, hygiene article dispenser, waste bin, used towel bin, and a toilet paper dispenser.

17. A system comprising a plurality of pieces of hygiene equipment according to claim 16 and a target device being coupled to a communication network.

18. A method of operating a piece of hygiene equipment, said method comprising the steps of:
- transmitting an outbound radio signal carrying transmission payload data;
- receiving an inbound radio signal carrying reception payload data;
- performing one or both of transmitting an outbound radio signal carrying specific transmission payload data, and receiving an inbound radio signal carrying specific reception payload data for determining a communication partner to which outbound radio signals are to be transmitted and from which inbound radio signals are to be received;
- determining said communication partner;
- storing information representing the determined communication partner in a memory section;
- determining whether a radio signal is presently being transmitted toward the piece of hygiene equipment; and
- delaying the transmitting of a signal by the piece of hygiene equipment as long as a radio signal is being transmitted toward the piece of hygiene equipment;
- buffering, by the processing section, received payload data carried by an inbound radio signal;
- transmitting, by the processing section, said buffered received payload data as relay payload data carried by an outbound radio signal to the communication partner;
- delaying, by the processing section, the transmitting of the relayed payload data according to a predetermined value; and
- changing, by the processing section, said predetermined value in response to determining an occurrence of interference.

* * * * *